United States Patent
Koefod

(10) Patent No.: US 7,588,696 B2
(45) Date of Patent: *Sep. 15, 2009

(54) ANTIMICROBIAL WATER SOFTENER SALT AND SOLUTIONS

(75) Inventor: Robert Scott Koefod, Maple Grove, MN (US)

(73) Assignee: Cargill, Incorporated, Wayzata, MN (US)

( * ) Notice: Subject to any disclaimer, the term of this patent is extended or adjusted under 35 U.S.C. 154(b) by 257 days.

This patent is subject to a terminal disclaimer.

(21) Appl. No.: 11/303,260

(22) Filed: Dec. 15, 2005

(65) Prior Publication Data

US 2006/0157415 A1    Jul. 20, 2006

Related U.S. Application Data

(63) Continuation-in-part of application No. 10/460,769, filed on Jun. 12, 2003, now Pat. No. 7,090,882.

(60) Provisional application No. 60/636,337, filed on Dec. 15, 2004, provisional application No. 60/637,674, filed on Dec. 16, 2004.

(51) Int. Cl.
*C02F 5/02* (2006.01)

(52) U.S. Cl. .................. 252/175; 426/326; 426/335; 210/670

(58) Field of Classification Search ............ 210/670, 210/674; 252/175; 426/326, 335
See application file for complete search history.

(56) References Cited

U.S. PATENT DOCUMENTS

| | | | |
|---|---|---|---|
| 2,854,477 A * | 9/1958 | Steinhauer | 562/75 |
| 3,216,932 A * | 11/1965 | Heiss et al. | 521/26 |
| 3,806,615 A | 4/1974 | Frankenfeld et al. | |
| 4,002,775 A | 1/1977 | Kabara | |
| 4,067,997 A | 1/1978 | Kabara | |
| 4,160,820 A | 7/1979 | Wagenknecht et al. | |
| 4,189,481 A | 2/1980 | Kabara | |

(Continued)

FOREIGN PATENT DOCUMENTS

EP    243 145    10/1987

(Continued)

OTHER PUBLICATIONS

The site "diphenyl oxide" at http://www.thegoodscentscompany.com/data/rw1004531.html, downloaded Nov. 23, 2008.*

(Continued)

*Primary Examiner*—Chester T Barry
(74) *Attorney, Agent, or Firm*—Perkins Coie LLP; Joseph P. Hamilton

(57) ABSTRACT

One embodiment of the present invention is a method of regenerating an ion exchange medium having a bacterial population, comprising dissolving a salt formulation in water to create a brine and passing the brine through the ion exchange medium during a regenerating cycle, wherein the salt formulation comprises a food-grade acid, at least about 100 ppm of a food-grade surfactant, and at least about 90 wt. % of an inorganic, water-soluble salt of sodium, potassium, or sodium and potassium and wherein the acid and the surfactant are present in the brine in an amount efficacious to kill at least about 65% of gram negative bacteria in the bacterial population as a result of the regenerating cycle.

20 Claims, 1 Drawing Sheet

U.S. PATENT DOCUMENTS

| | | | |
|---|---|---|---|
| 4,299,852 A | 11/1981 | Ueno et al. | |
| 4,363,763 A | 12/1982 | Peterson | |
| 4,469,635 A | 9/1984 | Peterson | |
| 4,485,029 A | 11/1984 | Kato et al. | |
| 4,539,212 A | 9/1985 | Hunter | |
| 4,576,728 A | 3/1986 | Stoddart | |
| 4,722,941 A | 2/1988 | Eckert et al. | |
| 4,749,508 A | 6/1988 | Cockrell, Jr. et al. | |
| 4,749,561 A | 6/1988 | Lane et al. | |
| 4,820,449 A | 4/1989 | Menke et al. | |
| 4,839,086 A * | 6/1989 | Zaid | 252/182.3 |
| 4,908,147 A | 3/1990 | Tsao et al. | |
| 4,921,694 A | 5/1990 | Hoppe et al. | |
| 4,938,953 A | 7/1990 | Pena et al. | |
| 5,079,036 A | 1/1992 | Roe et al. | |
| 5,093,140 A | 3/1992 | Watanabe | |
| 5,208,257 A | 5/1993 | Kabara | |
| 5,219,887 A | 6/1993 | Andrews et al. | |
| 5,284,833 A | 2/1994 | McAnalley et al. | |
| 5,364,650 A | 11/1994 | Guthery | |
| 5,378,731 A | 1/1995 | Andrews et al. | |
| 5,380,756 A | 1/1995 | Andrews et al. | |
| 5,460,802 A | 10/1995 | Asami et al. | |
| 5,460,833 A | 10/1995 | Andrews et al. | |
| 5,490,992 A | 2/1996 | Andrews et al. | |
| 5,520,575 A | 5/1996 | Dickson | |
| 5,569,461 A | 10/1996 | Andrews | |
| 5,585,028 A | 12/1996 | Berger | |
| 5,622,708 A | 4/1997 | Richter et al. | |
| 5,632,153 A | 5/1997 | Ricklefs et al. | |
| 5,756,107 A | 5/1998 | Hahn et al. | |
| 5,792,473 A | 8/1998 | Gergely et al. | |
| 5,909,745 A | 6/1999 | Ali et al. | |
| 5,968,539 A | 10/1999 | Beerse et al. | |
| 5,980,375 A | 11/1999 | Anderson et al. | |
| 6,121,215 A | 9/2000 | Rau | |
| 6,183,757 B1 | 2/2001 | Beerse et al. | |
| 6,190,675 B1 | 2/2001 | Beerse et al. | |
| 6,194,370 B1 | 2/2001 | Williams, Jr. et al. | |
| 6,197,315 B1 | 3/2001 | Beerse et al. | |
| 6,197,738 B1 | 3/2001 | Regutti | |
| 6,214,363 B1 | 4/2001 | Beerse et al. | |
| 6,214,783 B1 | 4/2001 | Gambogi et al. | |
| 6,217,887 B1 | 4/2001 | Beerse et al. | |
| 6,231,843 B1 | 5/2001 | Hoelzel et al. | |
| 6,284,259 B1 | 9/2001 | Beerse et al. | |
| 6,287,577 B1 | 9/2001 | Beerse et al. | |
| 6,376,438 B1 | 4/2002 | Rosenberger et al. | |
| 6,407,143 B1 | 6/2002 | Even et al. | |
| 6,432,885 B1 | 8/2002 | Vollmer | |
| 6,475,499 B2 | 11/2002 | Maubru et al. | |
| 6,867,233 B2 | 3/2005 | Roselle et al. | |
| 7,090,882 B2 * | 8/2006 | Koefod et al. | 426/326 |
| 2002/0004464 A1 | 1/2002 | Nelson et al. | |
| 2002/0098210 A1 | 7/2002 | Hahn et al. | |
| 2002/0182267 A1 | 12/2002 | Kleinberg et al. | |
| 2003/0176500 A1 | 9/2003 | Molly et al. | |
| 2003/0180377 A1 | 9/2003 | Ramirez et al. | |
| 2003/0185902 A1 | 10/2003 | Hei et al. | |
| 2004/0253352 A1 * | 12/2004 | Koefod et al. | 426/335 |
| 2005/9996245 | 5/2005 | Hei et al. | |

FOREIGN PATENT DOCUMENTS

| | | |
|---|---|---|
| EP | 244 144 | 11/1987 |
| EP | 312 519 | 4/1989 |
| EP | 368 622 | 5/1990 |
| EP | 530 861 | 3/1993 |
| EP | 633 767 | 1/1995 |
| EP | 670 160 | 9/1995 |
| EP | 713 096 | 5/1996 |
| EP | 874 988 | 11/1998 |
| EP | 891 711 | 1/1999 |
| WO | 88/00463 | 1/1988 |
| WO | 92/21320 | 12/1992 |
| WO | 93/00100 | 1/1993 |
| WO | 93/19154 | 9/1993 |
| WO | 93/19159 | 9/1993 |
| WO | 94/09106 | 4/1994 |
| WO | 95/07616 | 3/1995 |
| WO | 95/07616 A1 | 3/1995 |
| WO | 95/32705 | 12/1995 |
| WO | 96/19181 | 6/1996 |
| WO | 97/22878 | 6/1997 |
| WO | 98/09520 | 3/1998 |
| WO | 98/55093 | 12/1998 |
| WO | 98/55095 | 12/1998 |
| WO | 99/20729 | 4/1999 |
| WO | 99/36494 | 7/1999 |
| WO | 99/66020 | 12/1999 |
| WO | 00/01238 | 1/2000 |
| WO | 00/22082 | 4/2000 |
| WO | 00/30460 | 6/2000 |
| WO | 00/61105 | 10/2000 |
| WO | 0071183 | 11/2000 |
| WO | 01/16267 | 3/2001 |
| WO | 01/41927 A1 | 6/2001 |
| WO | 01/43549 | 6/2001 |
| WO | 0155287 | 8/2001 |
| WO | 02/15809 | 2/2002 |
| WO | 02/24845 | 3/2002 |
| WO | 02/50223 | 6/2002 |
| WO | 2005/000029 A2 | 1/2005 |
| WO | 2006/066253 A2 | 6/2006 |
| WO | 2007/084607 A2 | 7/2007 |
| WO | 2007/139722 A1 | 12/2007 |

OTHER PUBLICATIONS

International Search Report for PCT/US05/46150 dated Sep. 5, 2006 (1 page).

International Search Report for PCT/US07/01320 dated Dec. 5, 2007 (2 pages).

International Search Report for PCT/US07/11910 dated Oct. 24, 2007 (1 page).

International Search Report for PCT/US04/18862 dated Jun. 20, 2005 (1 page).

R.E. Wooley, DVM, Ph.D.: EDTA-tris Potentiation of Antimicrobial Agents, *Modern Veterinary Practice*, pp. 113-116, Feb. 1983.

Rachel Schemmel, et al.: Monolaurin as an Anticaries Agent, *Symposium on the Pharmalogical Effect of Lipids*, St. Louis, The American Oil Chemist's Society, Champaign, Illinois, p. 37.

Nobuyuki Kato, et al.: *Combined Effect of Citric and Polyphosphoric Acid on the Antibacterial Activity of Monoglycerides*, pp. 2-9, Apr. 10, 1976.

Nobuyuki Kato, et al.: *Combined Effect of Different Drugs on the Antibacterial Activity of Fatty Acids and Their Esters*, pp. 1-7, Sep. 25, 1975.

* cited by examiner

ANTIMICROBIAL WATER SOFTENER SALT AND SOLUTIONS

CROSS-REFERENCE TO RELATED APPLICATIONS

This application is a continuation-in-part application of U.S. application Ser. No. 10/460,769, filed 12 Jun. 2003 now U.S. Pat. No. 7,090,882 entitled ANTIMICROBIAL SALT SOLUTIONS FOR FOOD-SAFETY APPLICATIONS. This application also claims the benefit of U.S. Provisional Application No. 60/636,337, filed 15 Dec. 2004 entitled ANTIMICROBIAL WATER SOFTENER SALT AND SOLUTIONS and U.S. Provisional Application No. 60/637,674, filed 16 Dec. 2004 entitled ANTIMICROBIAL WATER SOFTENER SALT AND SOLUTIONS. The entirety of each of these applications is incorporated herein by reference.

BACKGROUND

This invention generally relates to salt-based formulations having antimicrobial activity and antimicrobial solutions made therefrom. Aspects of the invention have particular utility in connection with water softening and other applications in which ions in a solution may be removed or exchanged.

So-called "hard" water contains excess mineral salts, e.g., calcium and magnesium salts. A variety of techniques have been used to remove or replace ions of these mineral salts to "soften" the water. These techniques include distillation, adding water softening compounds to the water, membrane filtration, and ion exchange, e.g., cation exchange. Ion exchange-based water softening is used in a variety of industrial applications and is particularly prevalent in smaller-scale water softening systems used to treat water coming into individual homes. Ion exchange is also used to remove ions from water and other solutions in other applications.

Generally, ion exchange-based water treatment systems pass water through an ion exchange medium, which exchanges ions in the water with substitute ions, e.g., by exchanging mineral cations with cations of sodium or potassium. A wide variety of such media are known in the art, including resins, which may be strong or weak acid or strong or weak base ion exchange resins, and microporous minerals such as zeolites. For example, U.S. Patent Application Publication No. 2002/0072545 (published Jun. 13, 2002, the entirety of which is incorporated herein by reference), suggests a synthetic ion exchange resin that may comprise a styrene-divinylbenzene copolymer or an acrylic-divinylbenzene copolymer. From time to time, such ion exchange media must be regenerated by exchanging preferred cations for the cations accumulated in the media from treating the hard water. This is typically accomplished by delivering brine to the ion exchange resin during a regeneration cycle that typically lasts on the order of 30 minutes. After passing through the ion exchange medium, the brine is commonly discharged into the environment.

Bacteria may become attached to the surface of the ion exchange medium and proliferate. Over time, the bacteria can create a biofilm on the medium, reducing efficacy of the medium. In some circumstances, the water exiting the ion exchange medium may have a bacteria population that is higher than the bacteria content of the water entering the ion exchange resin. Some opportunistic and disease-causing bacteria that have been found to flourish on ion exchange media may present health risks for the elderly and those with weakened immune systems if present in significant enough concentration. As a consequence, some European countries forbid the use of water softeners without a mechanism for disinfecting the water exiting the water softening system.

Reducing bacterial contamination of ion exchange media by delivering antimicrobial agents to the resin presents a number of difficulties. Calcium hypochlorite is inexpensive and is commonly recognized as a highly effective antimicrobial agent useful in a variety of applications. Unfortunately, calcium hypochlorite is known to reduce the useful life of many common ion exchange resins and manufacturers of such resins caution against its use. A variety of other common antimicrobial agents are ill-suited for applications in which they may be ingested, such as in softening potable water, because of health concerns and/or sensory degradation, e.g., adversely affecting the taste or odor of treated water. Adequately flushing the resin prior to reuse can ameliorate these effects, but consumers may still resist adopting approaches that employ chemicals they deem undesirable. Still other known antimicrobial agents are cost-prohibitive or present environmental waste disposal challenges.

DETAILED DESCRIPTION

A. Overview

Figure 1:
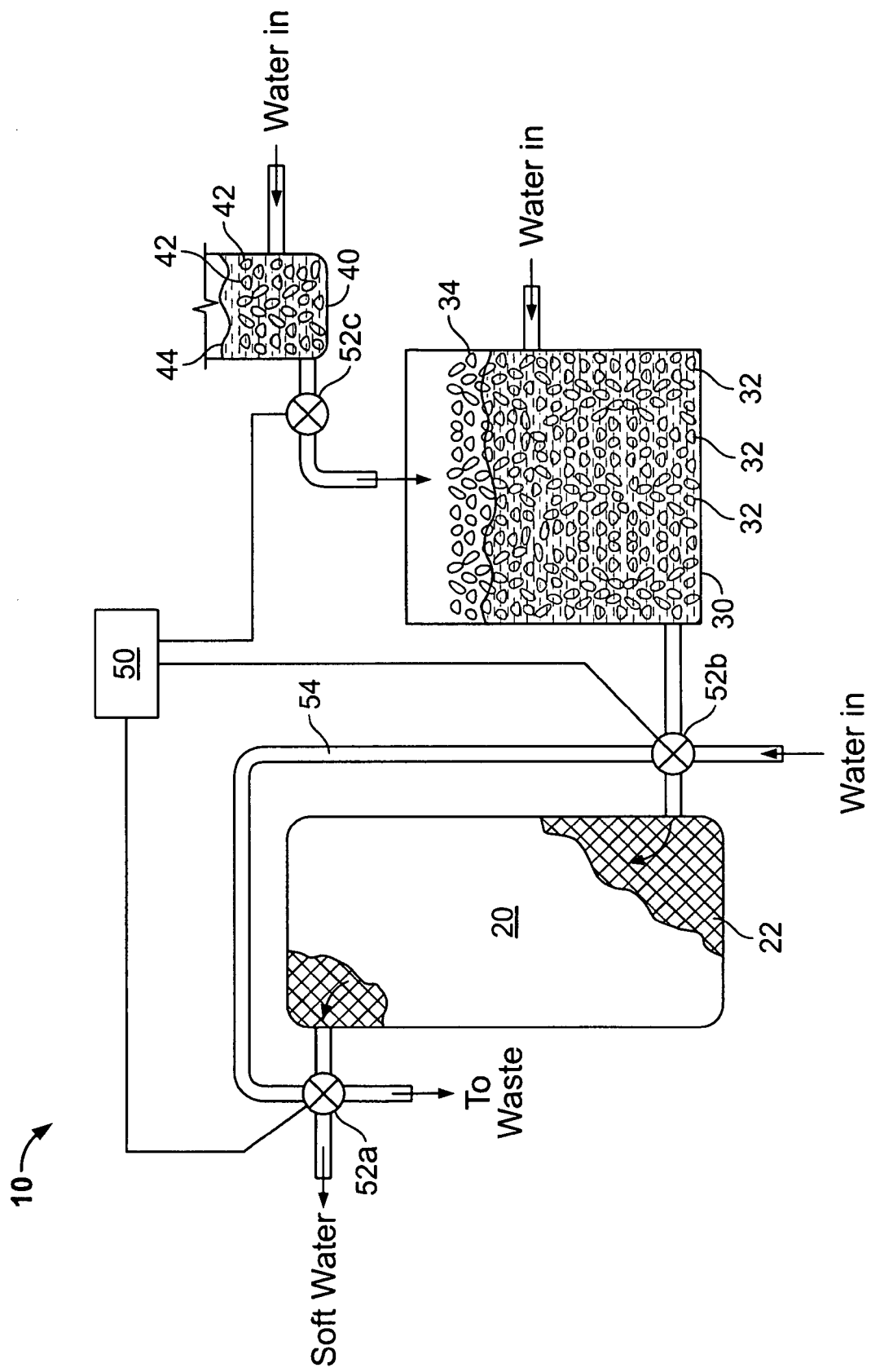
FIG. 1 is a schematic overview of a water softener system in accordance with an embodiment of the invention.

Salt has been used in water softener systems to rejuvenate ion exchange media. Acids and surfactants have been used as antibacterial agents in other applications. However, it has been discovered that inorganic salts act synergistically with acid and surfactant ingredients to provide a significant and unexpected increase in their antibacterial effectiveness. More particularly, initial tests revealed an unexpected, synergistic effect between sodium chloride and an acid/SLS (sodium lauryl sulfate) antimicrobial additive. Replicate tests were run to determine if this effect was significant. Solutions were also prepared containing an identical concentration of acid and SLS but no sodium chloride. Results of these tests, run with multiple replicates, illustrate that salt formulations including SLS and either citric acid or malic acid yield many fewer living microorganisms after 30 minutes than either plain NaCl or salt-free compositions of the same levels of SLS and citric or malic acid. Further testing suggests that the combination of at least select inorganic salts with surfactants can also yield surprising increases in the kill rates of bacteria when compared to either the salt alone or the surfactant alone.

Aspects of the invention described herein variously provide antimicrobial additives for a brine solution, salt-based formulations and solutions and water softener systems. One embodiment of the invention provides a mixture of a salt, such as sodium chloride, with an acid and a surfactant, such as sodium lauryl sulfate. Suitable acids include citric, malic, acetic, propionic, lactic, benzoic, ascorbic, isoascorbic, sorbic, phosphoric, hydrochloric, malic, tartaric, adipic, succinic, glutaric, salicylic, and sulfuric acids as well as sodium bisulfate. The salt can be selected from inorganic salts including the chloride, sulfate, nitrate, phosphate, carbonate, and hydroxide salts of sodium, potassium, magnesium, calcium, iron, and ammonium. Suitable surfactants include sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and its salts, the sodium salt of sulfonated oleic acid, sodium dodecylbenzene sulfonate, and dodecyldiphenyloxide disulfonic acid and its salts.

As used herein, a "food-safe" substance, e.g., a "food-safe" surfactant, is a substance that is safe for human consumption at the levels anticipated to be present in water (for example) treated in accordance with embodiments of the invention. Although a "food-safe" substance may be classified by the US Food and Drug Administration as "generally recognized as safe" (GRAS), many food-safe substances are not GRAS and their use in some food-related applications may require further regulatory approval in some countries.

B. Water Softener Systems

FIG. 1 schematically illustrates a water softening system in accordance with one embodiment of the invention. The water softening system 10 generally includes an ion exchange tank 20, a regenerating solution reservoir 30, and an antimicrobial agent reservoir 40. A controller 50 may be operatively coupled to one or more valves 52 (identified as valves 52a, 52b, and 52c in FIG. 1) to control operation of the water softening system 10.

The ion exchange tank 20 includes an ion exchange medium 22 through which water passes for treatment. Any suitable ion exchange medium 22 known in the art may be employed, including ion exchange resins and suitable mineral-based media such as zeolites. In normal operation, incoming water, e.g., water from a municipal water supply, is directed by valve 52b into the ion exchange tank 20. Treated or "softened" water exiting the ion exchange tank 20 may pass through valve 52a to deliver soft water for use, e.g., as potable water for a household.

From time to time, the ion exchange medium 22 may need to be regenerated by exchanging built-up ions removed from the incoming water supply with alternate ions, such as sodium or potassium ions. The controller 50 may be programmed to initiate a regenerating cycle at fixed intervals or on any other suitable basis; a variety of programmable controllers 50 for use in water softening systems 10 are commercially available. At the beginning of a regenerating cycle, the valve 52b may be changed to incoming water into a bypass line 54 for delivery to the first valve 52a. During the regenerating cycle, the valve 52a may direct this bypass water into the conduit conventionally used to deliver the softened water. In this configuration, the second valve 52b may also direct fluid from the regenerating solution tank 30 into the ion exchange tank 20. (Each of the valves 52 may comprise a single valve or a set of valves.) The solution passing through the ion exchange tank 20 may then be diverted by the first valve 52a to waste, e.g., to be discharged to the environment.

The regenerating solution reservoir 30 may include a ready supply of a regenerating solution 34, which may comprise a dissolved fraction of a salt-based formulation in accordance with other embodiments of the invention or a conventional water-softening salt. The salt formulation may be provided in the form of pellets 32 or in other suitable particulate form, such as pieces that are broken from a large, thick sheet of the salt. The solution 34 typically is about 10 weight percent of the salt.

The water softening system 10 of FIG. 1 also includes an antibacterial agent reservoir 40 that includes an antimicrobial solution 44. The antimicrobial solution 44 may comprise water in which a portion of the pellets 42 or a block of a water-soluble antimicrobial formulation in accordance with select embodiments is dissolved. A quantity of the antimicrobial solution 44 may be delivered to the ion exchange tank 20 during regeneration. In the schematic illustration of FIG. 1, the controller 50 would open the valve 52c to deliver the antimicrobial solution 44 to the regenerating solution tank 30. This antimicrobial solution 44 can mix with the regenerating solution 34 for delivery to the ion exchange tank 20. Alternatively, the antimicrobial solution 44 may bypass the regenerating solution reservoir 30, e.g., by being delivered to the second control valve 52b. Alternatively, the regenerating solution 34 and the antimicrobial solution 44 may be delivered to and pass through the ion exchange tank 20 sequentially rather than together. For example, the antimicrobial solution 44 may be delivered to the tank 20, followed either immediately or at a later time by the regenerating solution 34.

After the regenerating solution 34 and/or antimicrobial solution 44 has passed through the ion exchange medium 22, the valves 52a-c may be returned to their first configuration and operation can return to normal, i.e., with incoming water passing through the ion exchange tank 20 to deliver softened water for use.

C. Antimicrobial Formulations and Solutions

Substantial concentrations of salt make antimicrobial salt formulations and solutions in embodiments of the invention well-suited for a variety of applications, including use in regenerating ion exchange media such as those employed in water softener systems. For ease of understanding, the following discussion refers to the water softener system 10 shown in FIG. 1. Antimicrobial formulations and solutions in accordance with aspects of the invention may be used in the water softener system 10, but are also well-suited for use in conventional water softening systems and in other ion exchange-based treatment systems. Further, although the following discussion focuses on use of antimicrobial salt formulations and solutions for such regeneration, they are useful for other purposes, as well, such as in chilled brine processing of meat and other food-safety applications.

One useful formulation contains about 25-25,000 ppm surfactant, about 0.1-25 weight percent (wt. %.) acid, and about 72.5-99.9 wt. % salt. This formulation can be dissolved in water in the regenerating solution reservoir 30 to make a regenerating solution ranging in concentration from about 1% total solids by weight (i.e., about 1 wt. % of the salt-based formulation) up to the saturation point. Typically, brine solutions used in regenerating ion exchange media have a salt concentration of about 10 wt. %; regenerating solutions having about 8-11 wt. % of an antimicrobial salt formulation of the invention are expected to work well for the same purpose.

Suitable surfactants include sodium lauryl sulfate (SLS), linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof. The sodium salt of sulfonated oleic acid, sodium dodecylbenzene sulfonate, and dodecyldiphenyloxide disulfonic acid and salts thereof may also be employed as the surfactant. In one embodiment, the surfactant is soluble in a concentrated aqueous salt solution, e.g., an aqueous solution containing 10 wt. % or more of the salt used in the formulation. Salt-based formulations in accordance with aspects of the invention may include about 50-25,000 ppm of at least one, possibly two or more, of these surfactants. SLS at a level of about 100-1000 ppm, e.g., about 100-500 ppm, is deemed particularly useful for ion exchange media regeneration.

Antimicrobial salt formulations in aspects of the invention also include about 0.3-25 wt. % of at least one acid selected from the group consisting of citric, malic, acetic, propionic, lactic, benzoic, ascorbic, isoascorbic, sorbic, phosphoric, hydrochloric, nitric, malic, tartaric, adipic, succinic, glutaric, salicylic, and sulfuric acids and sodium bisulfate. Of these, citric and malic acids are generally preferred, with contents of about 0.4-6 wt. %, e.g., about 0.5-2 wt. %, being expected to work well for a variety of applications.

The balance, e.g., about 75-99.7 wt. %, of the antimicrobial salt formulations may comprise at least one inorganic salt selected from the group consisting of sodium, potassium, magnesium, calcium, iron, and ammonium salts of chloride, sulfate, nitrate, phosphate, carbonate, and hydroxide. Salts of monovalent cations may be more desirable than polyvalent cation salts, with calcium and potassium salts, e.g., NaCl and KCl, being generally preferred. For anion exchange applications, salts of monovalent anions, e.g., a chloride or nitrate salt, are desirable.

In some embodiments, though, the balance of the antimicrobial salt formulation may include at least one component other than the salt. For example, the formulation may include a scenting agent to improve the odor of the regenerating solution 34 in the regeneration solution reservoir 30.

As explained below in connection with the data in Tables 1 to 11, testing suggests that at least certain surfactant/salt combinations can function as a much more effective antimicrobial agent than either the salt or the surfactant alone.

Formulations in accordance with the invention may be provided in a variety of forms. In one embodiment, the formulations are blended to yield a relatively homogeneous mixture and this mixture is compressed into pellets of a suitable size. Procedures and apparatus for pelletizing water softener salt are well known in the art and need not be detailed here. The formulations may instead be compressed into larger blocks for more convenient storage and handling. As is also known in the art, the formulation may be formed as a large, thick sheet and broken into suitably sized chunks. If so desired, the ingredients of the formulation may be mixed dry and compressed to form the sheet or the sheet can be formed by mixing the ingredients with a solvent and drying.

As noted above, one embodiment of the invention provides a water softener system 10 that includes a regenerating solution reservoir 30 and an antimicrobial agent reservoir 40. In one embodiment, the pellets 32 in the regenerating solution reservoir 30 may comprise a formulation in accordance with embodiments of the invention and the antimicrobial agent solution 44 can be used in the regenerating cycle on only intermittently or on an as-needed basis. In another embodiment, the pellets 32 may comprise a conventional water softening salt. In either embodiment, the pellets 42 of the antimicrobial agent may include at least one of the acids and/or at least one of the surfactants enumerated above, but at higher levels than in the preceding embodiments. The level of acid and surfactant in the pellets 42 may be selected so that the combination of the regenerating solution 34 and the antimicrobial agent solution 44 in desired proportions will yield a concentration of salt, acid and surfactant analogous to solutions made with the formulations outlined above.

In one particular embodiment, the antimicrobial formulation 42 in the antimicrobial agent reservoir 40 comprises about 20-35 wt. % of a food-grade acid, e.g., citric or malic acid, and about 0.1-1 wt. % of a food-grade surfactant; one exemplary formulation includes about 25-30 wt. %, e.g., about 28 wt. %, citric acid, and about 0.4 wt. % SLS. The balance of the antimicrobial formulation 42 may comprise an inorganic salt. If deemed necessary, the antimicrobial formulation 42 may also include an encapsulating agent or other additive that can slow dissolving of the formulation to a desirable rate. In an alternative approach useful for conventional water softening systems that do not employ a separate antimicrobial agent reservoir 40, a block or pellets 42 of such a more concentrated antimicrobial formulation 42 may be added directly to the regenerating solution reservoir 30 with conventional salt pellets 32, e.g., commercially available water softener salt. In one illustrative embodiment, a one-pound block of the antimicrobial formulation may be added to the regenerating solution reservoir 30 each time the supply of salt pellets 32 is replenished.

In another embodiment, the antimicrobial solution 44 may include an acid and a surfactant, but have little or no added salt. An acid/surfactant formulation in this embodiment may be formed into pellets 42 or a block and held in the antimicrobial agent reservoir to make an aqueous solution with added water. Alternatively, the formulation may be in liquid form instead of a solid pellet 42 or the like. This liquid may comprise a concentrate that is mixed with added water in the reservoir 40 or may be delivered in the final desired concentration for addition to the regenerating solution reservoir 30 or directly to the ion exchange tank 20, as described above. One exemplary composition contains about 5 wt. % of an acid, e.g., citric or malic acid, and about 700 ppm of a surfactant, e.g., SLS, and about one eighth of a gallon may be added to the ion exchange medium 22 (either directly or with the regenerating solution 34) in a regenerating cycle for the medium 22.

Early screening tests indicated that there was an unexpected synergistic effect between sodium chloride and an acid/SLS antibacterial additive. Replicate tests were run to determine if this effect was statistically significant. Ten percent by weight solutions were prepared of a formulation of 0.6 wt. % citric or malic acid, 100 ppm SLS, and 99.4 wt. % sodium chloride. Solutions were also prepared containing an identical concentration of acid and SLS but no sodium chloride. A bacterial culture suspension (*Escherichia coli* ATCC 11229) that had been incubated for 24 hours in Brain Heart Infusion (BHI) broth and had an initial inoculum count of about $10^9$ CFU/ml was serially diluted in cold Butterfield's Phosphate Buffered Water (BPBW) to $10^5$ CFU/ml. A 1.0 ml aliquot of this suspension was added to 100 ml of test solution at room temperature and mixed well, providing an initial inoculum of $10^3$ CFU/ml. After 30 minutes, the *E. coli* populations were enumerated by plating on tryptic soy agar (TSA), making serial dilutions as necessary in BPBW. Plates were incubated at 35° C.+/−2° C. for approximately 24 hours. Colonies were then counted and compared to the initial inoculum counts. Results of these tests run on 16 replicates of each test solution are given in Table 1.

TABLE 1

Effectiveness of Acid/SLS Solutions with and without Salt on *E. coli*

| Test Solution | Average *E. Coli* Conc. (CFU/ml) |
|---|---|
| citric acid, SLS, with salt | 540 |
| citric acid, SLS, without salt | 1054 |
| malic acid, SLS, with salt | 141 |
| malic acid, SLS, without salt | 2419 |

For both the citric acid/SLS and malic acid/SLS additives, the number of bacteria remaining alive after 30 minutes is much lower when salt is present than when there is no salt present. Analysis of the data indicates that there is a statistically significant increase in kill in the presence of salt ($p<0.05$). In contrast, a 10% solution of pure sodium chloride does not provide any significant kill of the test microorganisms.

Although the preceding test was carried out in deionized water, the tests reflected in Tables 2 and 3 were carried out in hard water to better simulate actual operation conditions for a water softening application. In general, the anti-bacterial effectiveness of the formulations decreased significantly in hard water, requiring higher acid and/or surfactant contents to achieve the same efficacy. Formulas containing sodium lauryl sulfate and either citric or malic acid, though, were effective in killing both gram negative and gram positive bacteria.

Replicate tests were next run on formulas containing sodium lauryl sulfate and either citric or malic acid to estimate the acid and/or surfactant content required to consistently provide at least about 65%, desirably at least about 90%, kill rates of the more resistant gram negative bacteria, *E. coli*. Salt formulations including at least about 100 ppm SLS were deemed more effective than formulations containing lower SLS levels. SLS will cause a small amount of foam formation in saturated brine. Other commercially available surfactants (such as Triton QS44 sold by The Dow Chemical Company of Midland, Mich., USA) could be substituted for sodium lauryl sulfate to avoid foaming, but many of those surfactants may not be food-safe (as is SLS) and may raise environmental concerns. A summary of the performance of formulations containing 100 ppm sodium lauryl sulfate and various amounts of citric acid or malic acid is given in Table 2, in which runs C1-C10 employed the stated citric acid content in the salt-based formulation and runs M1-M5 used malic acid instead of citric acid. (Again, the SLS and acid concentrations are in the salt-based formulation, not in the resultant solution formed with the formulation.)

TABLE 2

Percent Kill of *E. coli* After 30 Minutes in Hard Water*

| Run | 0.6 wt. % | 0.7 wt. % | 0.8 wt. % |
|-----|-----------|-----------|-----------|
| C1  | 85.4% (1) | —         | —         |
| C2  | 89.4% (1) | —         | —         |
| C3  | 65.7% (10)| —         | —         |
| C4  | 99.6% (1) | 99.8% (1) | 99.8% (1) |
| C5  | 80.2% (6) | 99.2% (1) | 100.0% (1)|
| C6  | 82.4% (3) | 98.5% (3) | 99.9% (3) |
| C7  | 94.8% (3) | 99.9% (3) | 99.9% (3) |
| C8  | 93.3% (3) | —         | 99.4% (3) |
| C9  | 98.5% (3) | 95.1% (3) | 93.2% (3) |
| C10 | —         | 99.6% (3) | 99.9% (3) |
| M1  | 95.5% (1) | —         | —         |
| M2  | 95.3% (1) | —         | —         |
| M3  | 100.0% (10)| 99.8% (1)| 99.8% (1) |
| M4  | 68.6% (6) | —         | —         |
| M5  | —         | 99.8% (3) | 99.6% (3) |

*The number of replicates in a given experiment is listed parenthetically.

*S. aureus* was grown in a fashion directly analogous to that set forth above for growth of the *E. coli* culture, except that the *S. aureus* plates were incubated for about 48 hours instead of 24 hours. Results of tests on *S. aureus* are given in Table 3, in which runs C1-C3 employed the stated citric acid content in the salt-based formulation and runs M1 and M2 used malic acid instead of citric acid. (The tested formulations were generally more effective toward *S. aureus* than *E. coli*, so fewer replicates were carried out on *S. aureus*.)

TABLE 3

Percent Kill of *S. aureus* After 30 Minutes in Hard Water*

| Run | 0.4 wt. % | 0.5 wt. % | 0.6 wt. % | 0.7 wt. % |
|-----|-----------|-----------|-----------|-----------|
| C1  | 70.6% (1) | 90.4% (1) | 99.1% (1) | 99.9% (3) |
| C2  | 99.9% (1) | —         | 100.0% (1)| —         |
| C3  | —         | —         | 99.9% (3) | —         |
| M1  | 86.3% (1) | 95.6% (1) | 99.9% (1) | —         |
| M2  | —         | —         | 100.0% (1)| —         |

*The number of replicates in a given experiment is listed parenthetically.

Based upon the results in Tables 2 and 3, a salt formulation including about 100 ppm sodium lauryl sulfate, about 0.6 wt. % citric acid or malic acid, and about 99.4 wt. % salt significantly decreases (e.g., at least a 65% reduction) both gram negative and gram positive bacteria populations. Increasing the acid content slightly to about 0.7 wt. % consistently killed at least about 90% of both gram negative and gram positive bacteria. As a matter of fact, the 0.7% acid formulas consistently killed about 95% or more of the tested gram negative bacteria and regularly killed at least about 99% of such bacteria.

The following examples further illustrate the synergistic and unexpected results from combining acid/surfactant with salt. An experiment was run to determine if solutions containing sodium chloride, sodium lauryl sulfate, and various acids would kill *L. monocytogenes* at cold temperatures. The following test procedure was used: A bacterial culture suspension (*L. monocytogenes* H2446 [CDC Global Standard]; Scott A-serotype 4b; 12243-serotype 1/2a; and a recent cooked meat and poultry facility isolate, WP4) that had been incubated for at least 5 days in BHI broth and had an initial inoculum count of about $10^9$ CFU/ml was serially diluted in cold BPBW to $10^5$ CFU/ml. A 1.0 ml aliquot of this suspension was added to 100 ml of cold (−7° C.+2° C.) test solution and mixed well, providing an initial inoculum of $10^3$ CFU/ml. The test solutions were incubated at −7° C.+/−2° C. for the duration of the experiment. At intervals of 0, 4, and 24 hours the *L. monocytogenes* populations in the test solutions were determined on Modified Oxford agar (MOX). MOX plates were incubated at 35° C.+/−2° C. for approximately 48 hours. Colonies were then counted and compared to the initial inoculum counts.

Results are given in Table 4. Each test solution was a 17% by weight solution of the listed formula prepared in soft water.

TABLE 4

Effect of Solutions of NaCl, SLS and various acids on *L. monocytogenes*

| Sample | CFU/ml time 0 | 4 hr | 24 hr | pH | Water Activity |
|---|---|---|---|---|---|
| 100% NaCl | 1550 | 1250 | 1170 | 7.88 | 0.88 |
| 2.0% Malic Acid, 500 ppm SLS, 98.0% NaCl | 0 | 0 | 0 | 1.21 | ND |
| 5.0% Na Bisulfate, 500 ppm SLS, 95.0% NaCl | 0 | 0 | 0 | 0.81 | 0.883 |
| Water Control | 1270 | 400 | 0 | 9.34 | 0.999 |
| 0.3% Malic Acid, 100 ppm SLS, 99.7% NaCl | 480 | 5 | 0 | 4.1 | ND |
| 0.5% Malic Acid, 100 ppm SLS, 99.5% NaCl | 176 | 0 | 0 | 3.31 | ND |
| 0.7% Malic Acid, 100 ppm SLS, 99.3% NaCl | 117 | 0 | 0 | 2.99 | 0.88 |
| 0.3% Citric Acid, 500 ppm SLS, 99.7% NaCl | 5 | 0 | 0 | 4.14 | ND |
| 0.5% Citric Acid, 500 ppm SLS, 99.5% NaCl | 0 | 0 | 0 | 3.37 | ND |
| 0.7% Citric Acid, 500 ppm SLS, 99.3% NaCl | 0 | 0 | 0 | 2.98 | 0.88 |
| 0.3% Malic Acid, 500 ppm SLS, 99.7% NaCl | 11 | 0 | 0 | 4.15 | ND |
| 0.5% Malic Acid, 500 ppm SLS, 99.5% NaCl | 3 | 0 | 0 | 3.39 | ND |
| 0.7% Malic Acid, 500 ppm SLS, 99.3% NaCl | 0 | 0 | 0 | 3.06 | 0.879 |
| 1.0% Citric Acid, 500 ppm SLS, 99.0% NaCl | 0 | 0 | 0 | 2.69 | ND |
| 1.0% Malic Acid, 500 ppm SLS, 99.0% NaCl | 0 | 0 | 0 | 2.81 | ND |
| 2.0% Lactic Acid, 500 ppm SLS, 98.0% NaCl | 0 | 0 | 0 | 2.65 | 0.885 |
| 2.0% Phosphoric Acid (75%), 500 ppm SLS, 98.0% NaCl | 0 | 0 | 0 | 1.52 | 0.884 |
| 1.0% Benzoic Acid, 500 ppm SLS, 99.0% NaCl | 0 | 0 | 0 | 3.93 | 0.879 |
| 2.0% Citric Acid, 500 ppm SLS, 98.0% NaCl | 0 | 0 | 0 | 2.3 | 0.884 |
| 2.0% Malic Acid, 500 ppm SLS, 98.0% NaCl | 0 | 0 | 0 | 2.46 | 0.882 |

In another experiment, two sets of solutions were tested. The first set (samples 1-12 in Table 5 below) was prepared in hard tap water and contained about 17.0% by mass of the identified formulation. These samples were inoculated with $10^3$ CFU/ml *L. monocytogenes* by the same procedure described above. A second set of samples was prepared from brine taken from a ready-to-eat meat processing operation. The recirculated brine had been used to chill packaged meat for one week. After a week of use the brine typically contains various types of aerobic psychrotrophic and mesophilic bacteria. This experiment was done in order to determine if the additives would kill the microorganisms naturally occurring in actual process brine from a plant. Since the spent chill brine samples already contained NaCl, citric acid and/or SLS was added to provide an effective concentration of additive. One set of these samples (samples 13-17) were inoculated with $10^3$ *L. monocytogenes* and the other set (samples 18-22) contained only the naturally occurring organisms in the spent chill brine. Results are given in Table 5 below. The data indicate that at lower acid levels, the SLS increases the effectiveness of the mixture, but at higher acid levels, the SLS is not necessary. The results show the formulations are effective in hard water. The results also demonstrate that the formulations effectively kill *L. monocytogenes* as well as the naturally occurring microorganisms in spent chill brine from an actual meat processing plant.

TABLE 5

Effects of Antimicrobial Salt Formulas in Hard Water and in Spent Chill Brine

| | Sample | CFU/ml 0 | 2 hr | 24 hr |
|---|---|---|---|---|
| 1 | 100% NaCl | 760 | 1100 | 1100 |
| 2 | 0.3% Citric Acid, 100 ppm SLS, 99.7% NaCl | 730 | 670 | 29 |
| 3 | 0.3% Citric Acid, 99.7% NaCl | 1460 | 1330 | 830 |
| 4 | 0.5% Citric Acid, 100 ppm SLS, 99.5% NaCl | 890 | 240 | 0 |
| 5 | 0.5% Citric Acid, 99.5% NaCl | 1060 | 1170 | 330 |
| 6 | 0.7% Citric Acid, 100 ppm SLS, 99.3% NaCl | 1010 | 14 | 0 |
| 7 | 0.7% Citric Acid, 99.3% NaCl | 1040 | 1030 | 3 |
| 8 | 1.0% Citric Acid, 100 ppm SLS, 99.0% NaCl | 840 | 0 | 0 |
| 9 | 1.0% Citric Acid, 99.0% NaCl | 990 | 340 | 0 |
| 10 | 2.0% Citric Acid, 98.0% NaCl | 910 | 0 | 0 |
| 11 | 4.0% Citric Acid, 96.0% NaCl | 1110 | 0 | 0 |
| 12 | 6.0% Citric Acid, 94.0% NaCl | 950 | 0 | 0 |
| 13 | Brine Control with *L. mono* | 1260 | 1290 | 600 |
| 14 | 1% Citric Acid in Brine with *L. mono* | 1050 | 0 | 0 |
| 15 | 2% Citric Acid in Brine with *L. mono* | 1140 | 0 | 0 |
| 16 | 1% Citric Acid + 50 ppm SLS in Brine with *L. mono* | 1090 | 0 | 0 |
| 17 | 2% Citric Acid + 50 ppm SLS in Brine with *L. mono* | 1070 | 0 | 0 |
| 18 | Brine Control | 6000 | 3100 | 2000 |
| 19 | 1% Citric Acid in Brine | 2490 | 190 | 4 |
| 20 | 2% Citric Acid in Brine | 1670 | 6 | 0 |
| 21 | 1% Citric Acid + 50 ppm SLS in Brine | 2520 | 122 | 0 |
| 22 | 2% Citric Acid + 50 ppm SLS in Brine | 1480 | 6 | 0 |

A test was run to determine if salts other than sodium chloride would show a synergistic antimicrobial effect with an acid and sodium lauryl sulfate. Solutions containing 0.6409 grams malic acid and 0.0107 grams sodium lauryl sulfate per liter were prepared with and without 107.0 grams of various salts (added on an anhydrous basis). Solutions were inoculated with *E. coli* described above and the amount of bacterial kill was measured to determine if the added salt caused an increase in the effectiveness of the acid/surfactant active ingredients. Results are shown in Table 6.

TABLE 6

Effect of Different Salts on the Antimicrobial Action of Malic Acid/SLS

| Solution (salt added) | % Kill of E. Coli |
|---|---|
| No salt addition | 4.4% |
| Sodium sulfate | 87% |
| Magnesium chloride | 56% |
| Potassium chloride | 18% |
| Sodium chloride | 78% |
| Potassium sulfate | 34% |
| Calcium chloride | 55% |
| Magnesium sulfate | 93% |

Tests run on solutions containing only the salt and no other ingredient indicate that sodium sulfate, potassium chloride, and potassium sulfate alone provide no bacterial kill. Magnesium chloride provided 61% kill, calcium chloride provided 26% kill, and magnesium sulfate provided 10% kill. Thus, based on the data developed thus far, sodium sulfate, sodium chloride, and magnesium sulfate appear to significantly increase the effectiveness of the acid/surfactant antimicrobial agent, even though the salts provide little kill on their own.

The effectiveness of antimicrobial salt formulas was tested against L. monocytogenes in a biofilm. Stainless steel coupons (2×5 cm, type 302 stainless steel, 2B finish) were cleaned in acetone followed by an alkaline detergent and distilled water and then dried in an autoclave at 121° C. for 15 minutes. A culture of L. monocytogenes (Scott A—serotype 4b) was prepared by inoculating 10 mL of TSA and incubating overnight at 35° C. 50 mL of sterile TSA+0.6% yeast extract (YE) was aseptically dispensed into sterile disposable conical shaped plastic tubes and one drop of overnight grown L. mono culture was added to each tube. Inoculated tubes were incubated at 25° C. for approximately 48 hours. After the biofilm had formed on the coupons, a coupon was aseptically removed from the tube and gently rinsed with distilled water to remove unattached cells. Coupons were then immersed in cold antimicrobial test solution (−6.7° C.) and incubated over different time intervals (1 hour, 24 hours, and 5 days). After incubation period, the coupon was shaken in a tube containing 40 mL of sterile PBW and 10 sterile glass beads (4 mm) for 2 minutes two remove the cells attached to the coupon biofilm. The cells were plated in the PBW on TSA+0.6% YE using appropriate dilutions and incubated at 35° C. for 48 hours.

Results on triplicate samples of antimicrobial test solutions are given in Table 7 below. Each solution contained 17% by weight of a formula consisting of the percentages of citric acid and SLS listed in Table 7 with the balance of the formula being NaCl in each case. The data indicate that not only are the antimicrobial salt solutions effective at killing bacteria suspended in solution, they are also effective at killing bacteria within a biofilm.

TABLE 7

Log Concentration of L. mono in Antimicrobial Salt Solutions

| Sample | 1 Hour | 24 Hours | 5 days |
|---|---|---|---|
| 0.3% citric acid, 100 ppm SLS | ~5.08 | 4.59 | 1.38 |
| 0.3% citric acid, 100 ppm SLS | ~4.90 | 3.85 | 1.79 |
| 0.3% citric acid, 100 ppm SLS | ~4.81 | 3.48 | 1.92 |
| 0.3% citric acid, 500 ppm SLS | 4.81 | 4.76 | 2.23 |
| 0.3% citric acid, 500 ppm SLS | 4.90 | 3.48 | 2.18 |
| 0.3% citric acid, 500 ppm SLS | ~5.18 | 3.48 | 2.36 |

TABLE 7-continued

Log Concentration of L. mono in Antimicrobial Salt Solutions

| Sample | 1 Hour | 24 Hours | 5 days |
|---|---|---|---|
| 0.7% citric acid, 100 ppm SLS | 1.88 | 0 | 0 |
| 0.7% citric acid, 100 ppm SLS | 2.02 | 0 | 0 |
| 0.7% citric acid, 100 ppm SLS | 1.28 | 0 | 0 |
| 0.7% citric acid, 500 ppm SLS | 0.70 | 1.00 | 0.90 |
| 0.7% citric acid, 500 ppm SLS | 0.90 | 0.70 | 0.30 |
| 0.7% citric acid, 500 ppm SLS | 0.85 | 0 | 0 |
| 2.0% citric acid, 100 ppm SLS | 0 | 0 | ND |
| 2.0% citric acid, 100 ppm SLS | 0 | 0 | ND |
| 2.0% citric acid, 100 ppm SLS | 0 | 0 | ND |
| 2.0% citric acid, 500 ppm SLS | 0 | 0 | ND |
| 2.0% citric acid, 500 ppm SLS | 0 | 0 | ND |
| 2.0% citric acid, 500 ppm SLS | 0 | 0 | ND |
| 6.0% citric acid, 100 ppm SLS | 0 | 0 | ND |
| 6.0% citric acid, 100 ppm SLS | 0 | 0 | ND |
| 6.0% citric acid, 100 ppm SLS | 0 | 0 | ND |
| 6.0% citric acid, 500 ppm SLS | 0 | 0 | ND |
| 6.0% citric acid, 500 ppm SLS | 0 | 0 | ND |
| 6.0% citric acid, 500 ppm SLS | 0 | 0 | ND |
| 12.0% citric acid, 100 ppm SLS | 0 | 0 | ND |
| 12.0% citric acid, 100 ppm SLS | 0 | 0 | ND |
| 12.0% citric acid, 100 ppm SLS | 0 | 0 | ND |
| 12.0% citric acid, 500 ppm SLS | 0 | 0 | ND |
| 12.0% citric acid, 500 ppm SLS | 0 | 0 | ND |
| 12.0% citric acid, 500 ppm SLS | 0 | 0 | ND |
| Salt Control A | ~5.04 | ~7.15 | 7.65 |
| Salt Control B | ~5.48 | ~7.15 | 7.42 |
| Salt Control C | ~5.48 | ~7.11 | 7.65 |
| Water Control | ~5.18 | ~7.18 | 7.54 |

Another set of experiments was done in order to determine the effectiveness of different acids and different types of surfactants in the antimicrobial salt formulations. In one experiment, test solutions containing 17% by weight of formulas containing various levels of sodium chloride, 100 ppm sodium lauryl sulfate, and various levels of different acids were tested for effectiveness in killing L. monocytogenes at cold temperatures. The same test procedure was used as described above; test solutions were plated on MOX TAL (Modified Oxford medium with a Thin Agar Layer) with TSA. Results are given in Table 8.

TABLE 8

Effect of Different Acids on the Antimicrobial Action of NaCl/Acid/SLS

| Sample | Time 0 (CFU/ml) | 4 Hours (CFU/ml) |
|---|---|---|
| Salt control | 850 | 1380 |
| Salt + 100 ppm SLS, 0.5% citric acid | 980 | 890 |
| 100 ppm SLS, 99.5% NaCl, 0.9% succinic acid | 1230 | 18 |
| 100 ppm SLS, 99.1% NaCl | 1070 | 69 |
| 1.5% isoascorbic acid, 100 ppm SLS, 98.5% NaCl | 1140 | 59 |
| 1.8% adipic acid, 100 ppm SLS, 98.2% NaCl | 900 | 4 |
| 1.6% sorbic acid, 100 ppm SLS, 98.4% NaCl | 820 | 500 |
| 1.3% acetic acid, 100 ppm SLS, 98.7% NaCl | 1070 | 230 |
| 2.1% propionic acid, 100 ppm SLS, 97.9% NaCl | 1440 | 6 |
| 0.6% lactic acid, 100 ppm SLS, 99.4% NaCl | 1050 | 220 |
| 1.6% ascorbic acid, 100 ppm SLS, 98.4% NaCl | 1230 | 54 |
| 0.3% formic acid, 100 ppm SLS, 99.7% NaCl | 1930 | 38 |
| 0.3% phosphoric acid, 100 ppm SLS, 99.7% NaCl | 1050 | 17 |
| 0.1% hydrochloric acid, 100 ppm SLS, 99.9% NaCl | 1100 | 44 |
| 0.3% tartaric acid, 100 ppm SLS, 99.7% NaCl | 1180 | 410 |
| 1.1% glutaric acid, 100 ppm SLS, 98.9% NaCl | 610 | 180 |
| 1.2% benzoic acid, 100 ppm SLS, 98.8% NaCl | 1020 | 17 |
| 0.5% salicylic acid, 100 ppm SLS, 99.5% NaCl | 1100 | 5 |
| 0.2% sulfuric acid, 100 ppm SLS, 99.8% NaCl | 830 | 0 |

In another experiment, test solutions containing 17% by weight of formulas containing 99.7% sodium chloride, 0.3% citric acid, and 500 ppm of various types of surfactants were tested for effectiveness in killing *L. monocytogenes* at cold temperatures. The same test procedure was used as described above; test solutions were plated on MOX TAL (Modified Oxford Medium with a Thin Agar Layer) with TSA. Results are given in Table 9.

TABLE 9

Effect of Different Acids on the Antimicrobial Action of NaCl Surfactant Tested

| Surfactant Tested | Time 0 (CFU/ml) | 4 Hours (CFU/ml) |
| --- | --- | --- |
| Salt Control (no additive) | 880 | 610 |
| polyoxyethylene-polyoxypropylene block polymer | 820 | 610 |
| sodium salt of sulfonated oleic acid | 240 | 0 |
| sodium xylene sulfonate | 910 | 820 |
| dodecyl diphenyl oxide disulfonate | 0 | 0 |
| sodium linear alkyl-benzene sulfonate | 490 | 0 |
| alpha-olefin sulfonate | 370 | 0 |
| Alkylpolyglucoside | 280 | 0 |
| nonylphenol ethoxylate | 460 | 0 |
| fatty alkanolamide | 470 | 0 |
| alcohol ethoxylate | 1080 | 1 |
| lauramine oxide | 2 | 0 |

Thus, the data indicate that solutions of salt, acid, and surfactant provide efficient kill of bacteria even at temperatures below the freezing point of water. Salts such as sodium sulfate, sodium chloride, and magnesium sulfate act synergistically with the acid and surfactant to enhance the antimicrobial effectiveness. The formulations are shown to be effective in killing pathogenic bacteria such as *L. monocytogenes*. The formulas were shown to be effective both in freshly prepared brines and in spent process chill brine from a ready-to-eat meat plant. The levels of acid and surfactant may be varied to suit the particular application; reducing the concentration of the acid may be compensated by raising the concentration of surfactant and vice versa. In addition to effectively killing bacteria suspended in solutions, the formulas are also shown to be effective at killing bacteria within a biofilm.

Further tests were conducted to determine the antimicrobial efficacy of a salt formulation containing a surfactant but no added acid. The effect of an aqueous solution comprising about 20 wt. % of various salt and salt/surfactant formulations on *L. monocytogenes* were tested in a manner directly analogous to that set forth above in connection with the data in Table 4. Table 10 sets forth the compositions and the *L. monocytogenes* population (stated as the log of the concentration of the bacteria) found after 4 hours of incubation. [Note that the compositions in Table 10 and in Table 11, below, state the concentration in the solution, not in the salt concentrate. Since the solutions are 20 wt. % of the salt formulation, the concentration of surfactant in the salt formulation would be about five times the stated concentration in the solution.]

TABLE 10

Effect of Solutions of NaCl and SLS on *L. monocytogenes*

| Solution Composition | Population at 4 hours |
| --- | --- |
| Water Control | 4.61 |
| 20% NaCl (control) | 4.32 |
| 50 ppm SLS (no NaCl) | 3.90* |
| 50 ppm SLS, 20% NaCl | 0.85** |

TABLE 10-continued

Effect of Solutions of NaCl and SLS on *L. monocytogenes*

| Solution Composition | Population at 4 hours |
| --- | --- |

*The 3.90 value is an average of two runs that yielded values of 3.84 and 3.95.
**The 0.85 value is an average of two runs that yielded values of 0.70 and 1.00.

Further tests were run on a variety of different surfactants, demonstrating that a variety of different types of surfactants show a strong synergistic effect in combination with sodium chloride:

TABLE 11

Effect of Solutions of NaCl and various surfactants on *L. monocytogenes*

| Solution Composition | Population (4 hours) |
| --- | --- |
| Water Control | 4.85 |
| 20% NaCl (control) | 5.01 |
| 50 ppm sodium salt of sulfonated oleic acid (no NaCl) | 5.11 |
| 50 ppm sodium salt of sulfonated oleic acid, 20% NaCl | 3.89 |
| 50 ppm lauramine oxide (no NaCl) | 3.56 |
| 50 ppm lauramine oxide, 20% NaCl | 0 |
| 50 ppm fatty alkanolamide (no NaCl) | 4.02 |
| 50 ppm fatty alkanolamide, 20% NaCl | 0 |
| 50 ppm nonylphenol ethoxylate (no NaCl) | 5.12 |
| 50 ppm nonylphenol ethoxylate, 20% NaCl | 1.60 |
| 50 ppm sodium linear alkly-benzenesulfonate (no NaCl) | 3.77 |
| 50 ppm sodium linear alkly-benzenesulfonate, 20% NaCl | 0 |
| 50 ppm alkylpolyglucosides (no NaCl) | 4.98 |
| 50 ppm alkylpolyglucosides, 20% NaCl | 1.00 |

Hence, formulations in other embodiments of the invention may comprise an inorganic salt and at least about 200 ppm of a surfactant, e.g., about 250-5000 ppm, e.g., 500-1500 ppm, of the surfactant. Such formulations are deemed particularly useful in food safety applications.

The foregoing specification describes this invention in relation to certain preferred embodiments, and many details have been set forth for purpose of illustration. As those skilled in the art will appreciate, however, the invention is susceptible to additional embodiments and that some of the details mentioned above can be varied considerably without departing from the basic principles of the invention.

I claim:

1. An antimicrobial water softening composition, comprising:
   about 100-25,000 ppm of at least one surfactant selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof; the sodium salt of sulfonated oleic acid, sodium dodecylbenzene sulfonate, dodecyldiphenyloxide disulfonic acid and salts thereof;
   about 0.3-25 weight percent (wt. %) of at least one acid selected from the group consisting of citric, malic, acetic, propionic, lactic, benzoic, ascorbic, isoascorbic, sorbic, phosphoric, hydrochloric, nitric, malic, tartaric, adipic, succinic, glutaric, salicylic, and sulfuric acids and sodium bisulfate; and
   about 75-99.7 wt. % of at least one inorganic salt selected from the group consisting of sodium chloride or potassium chloride.

2. An antimicrobial water softening composition, comprising:
- about 100-25,000 ppm of at least one surfactant selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof: the sodium salt of sulfonated oleic acid, sodium dodecylbenzene sulfonate, dodecyldiphenyloxide disulfonic acid and salts thereof;
- about 0.3-25 weight percent (wt. %) of acid, wherein the acid comprises at least about 0.1 wt. % phosphoric acid and at least about 0.3 wt. % of an acid selected from the group consisting of citric and malic acids; and
- about 75-99.7 wt. % of at least one inorganic salt selected from the group consisting of sodium, potassium, magnesium, calcium, iron, and ammonium salts of chloride, sulfate, nitrate, phosphate, carbonate, and hydroxide.

3. An antimicrobial water softening composition, comprising:
- about 100-25,000 ppm of at least one surfactant, wherein the surfactant comprises sodium lauryl sulfate;
- about 0.3-25 weight percent (wt. %) of at least one acid selected from the group consisting of citric, malic, acetic, propionic, lactic, benzoic, ascorbic, isoascorbic, sorbic, phosphoric, hydrochloric, nitric, malic, tartaric, adipic, succinic, glutaric, salicylic, and sulfuric acids and sodium bisulfate; and
- about 75-99.7 wt. % of at least one inorganic salt selected from the group consisting of sodium, potassium, magnesium, calcium, iron, and ammonium salts of chloride, sulfate, nitrate, phosphate, carbonate, and hydroxide.

4. An antimicrobial water softening composition, comprising:
- about 100-25,000 ppm of at least one surfactant selected from the group consisting of sodium lauryl sulfate, linear alkylbenzene sulfonates, alcohol sulfates, alpha-olefin sulfonates, alcohol ethoxylates, nonylphenyl ethoxylates, alkylpolyglucosides, fatty alkanoamides, fatty amine oxides, sodium dioctylsulfosuccinate, dodecylbenzene sulfonic acid and salts thereof: the sodium salt of sulfonated oleic acid, sodium dodecylbenzene sulfonate, dodecyldiphenyloxide disulfonic acid and salts thereof;
- about 0.3-25 weight percent (wt. %) of at least one acid selected from the group consisting of citric, malic, acetic, propionic, lactic, benzoic, ascorbic, isoascorbic, sorbic, phosphoric, hydrochloric, nitric, malic, tartaric, adipic, succinic, glutaric, salicylic, and sulfuric acids and sodium bisulfate;
- about 75-99.7 wt. % of at least one inorganic salt selected from the group consisting of sodium, potassium, magnesium, calcium, iron, and ammonium salts of chloride, sulfate, nitrate, phosphate, carbonate, and hydroxide; and a food-grade scent compound.

5. An antimicrobial water softening composition for use in regenerating an ion exchange medium, comprising:
- about 0.3-6 wt. % citric acid, malic acid, or a combination of citric acid and malic acid;
- about 100-500 ppm sodium lauryl sulfate; and
- about 94-99.7 wt. % sodium chloride, potassium chloride, or a combination of sodium chloride and potassium chloride.

6. The antimicrobial water softening composition of claim 5 wherein the salt comprises salt pellets.

7. The composition of claim 1 further comprising a food-grade scent compound.

8. The composition of claim 1 wherein the acid further comprises at least about 0.1 wt. % phosphoric acid and at least about 0.3 wt. % of an acid selected from the group consisting of citric and malic acids.

9. The composition of claim 1 wherein the surfactant comprises sodium lauryl sulfate.

10. The composition of claim 2 further comprising a food-grade scent compound.

11. The composition of claim 2 wherein the surfactant comprises sodium lauryl sulfate.

12. The composition of claim 2 wherein the salt comprises sodium chloride or potassium chloride.

13. The composition of claim 3 further comprising a food-grade scent compound.

14. The composition of claim 3 wherein the acid further comprises at least about 0.1 wt. % phosphoric acid and at least about 0.3 wt. % of an acid selected from the group consisting of citric and malic acids.

15. The composition of claim 3 wherein the salt comprises sodium chloride or potassium chloride.

16. The composition of claim 4 wherein the acid further comprises at least about 0.1 wt. % phosphoric acid and at least about 0.3 wt. % of an acid selected from the group consisting of citric and malic acids.

17. The composition of claim 4 wherein the surfactant comprises sodium lauryl sulfate.

18. The composition of claim 4 wherein the salt comprises sodium chloride or potassium chloride.

19. The composition of claim 5 further comprising a food-grade scent compound.

20. The composition of claim 6 further comprising a food-grade scent compound.

* * * * *

UNITED STATES PATENT AND TRADEMARK OFFICE
CERTIFICATE OF CORRECTION

PATENT NO. : 7,588,696 B2 Page 1 of 1
APPLICATION NO. : 11/303260
DATED : September 15, 2009
INVENTOR(S) : Robert Scott Koefod It is certified that error appears in the above-identified patent and that said Letters Patent is hereby corrected as shown below:

In column 15, line 9, in Claim 2, delete "thereof:" and insert -- thereof; --, therefor.

In column 15, line 43, in Claim 4, delete "thereof:" and insert -- thereof; --, therefor.

Signed and Sealed this

Thirtieth Day of March, 2010

David J. Kappos
*Director of the United States Patent and Trademark Office*